US012705046B2

(12) United States Patent
Copty et al.

(10) Patent No.: US 12,705,046 B2
(45) Date of Patent: Aug. 11, 2026

(54) DEVELOPMENT AND OPERATIONS SERVER WITH CODE MAPPING MODULE

(71) Applicant: Microsoft Technology Licensing, LLC, Redmond, WA (US)

(72) Inventors: Fady Copty, Haifa (IL); Moshe Israel, Redmond, WA (US); David Trigano, Bellevue, WA (US); Lara Nicole Goldstein, Dallas, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 18/499,657

(22) Filed: Nov. 1, 2023

(65) Prior Publication Data

US 2025/0138805 A1 May 1, 2025

(51) Int. Cl.
*G06F 9/455* (2018.01)
*G06F 8/65* (2018.01)
(Continued)

(52) U.S. Cl.
CPC .................. *G06F 8/65* (2013.01); *G06F 8/60* (2013.01); *G06F 8/63* (2013.01); *G06F 8/70* (2013.01);
(Continued)

(58) Field of Classification Search
CPC ..... G06F 8/65; G06F 8/71; G06F 8/63; G06F 8/60; G06F 8/70; G06F 11/3006;
(Continued)

(56) References Cited

U.S. PATENT DOCUMENTS 10,871,957 B2 * 12/2020 Ryall ........................ G06F 8/60
10,922,214 B1 2/2021 Nadein et al.
(Continued)

FOREIGN PATENT DOCUMENTS

CN 115237469 A 10/2022
CN 112148602 B 3/2023

OTHER PUBLICATIONS

"Cloud-Native Application Protection Platform (CNAPP)", Retrieved from: https://www.paloaltonetworks.com/prisma/cloud/cloud-native-application-protection-platform, Retrieved Date: Jul. 26, 2023, 20 Pages.

(Continued)

*Primary Examiner* — Anibal Riveracruz
(74) *Attorney, Agent, or Firm* — Alleman Hall LLP

(57) ABSTRACT

A distributed computing system includes a code repository server configured to store code, a code deployment server configured to receive a deployment of the code, and a development and operations (DevOps) server configured to construct a pipeline between the code repository server and the code deployment server. The DevOps server is configured to execute a source code management program to receive a request for information regarding a target resource that has been deployed using the pipeline, generate a permissions model for the target resource, the permissions model including one or more permissions, each permission authorizing a managed identity to execute an action related to the target resource, determine a permissions usage history of the permissions contained in the permissions model, filter the permissions model based on the permissions usage history, and generate a list of events determined to have occurred as the filtered permissions model.

20 Claims, 7 Drawing Sheets

(51) Int. Cl.

| | |
|---|---|
| ***G06F 8/71*** | (2018.01) |
| ***G06F 11/30*** | (2006.01) |
| ***G06F 11/34*** | (2006.01) |
| ***G06F 21/54*** | (2013.01) |
| ***G06F 21/57*** | (2013.01) |
| *G06F 8/60* | (2018.01) |
| *G06F 8/61* | (2018.01) |
| *G06F 8/70* | (2018.01) |
| *G06F 9/54* | (2006.01) |

(52) U.S. Cl.
CPC ................ *G06F 8/71* (2013.01); *G06F 9/455* (2013.01); *G06F 9/45558* (2013.01); *G06F 9/545* (2013.01); *G06F 11/3006* (2013.01); *G06F 21/577* (2013.01)

(58) Field of Classification Search
CPC ...... G06F 9/45558; G06F 9/455; G06F 9/545; G06F 21/577
See application file for complete search history.

(56) References Cited

U.S. PATENT DOCUMENTS

| | | | |
|---|---|---|---|
| 10,936,478 B2 | 3/2021 | Meibusch et al. | |
| 11,151,024 B2 | 10/2021 | Hwang et al. | |
| 11,531,537 B2 * | 12/2022 | Negoshian | G06Q 40/12 |
| 12,126,643 B1 * | 10/2024 | Skarphedinsson | H04L 63/1441 |
| 12,321,250 B1 * | 6/2025 | Dalgaard | G06F 11/3006 |
| 2021/0097444 A1 * | 4/2021 | Bansal | G06N 20/20 |
| 2021/0200814 A1 * | 7/2021 | Tal | G06F 16/90335 |
| 2022/0050703 A1 * | 2/2022 | Woodhull | G06F 8/35 |
| 2022/0326925 A1 * | 10/2022 | Amundson | G06F 8/60 |
| 2025/0117492 A1 * | 4/2025 | Schneider | G06F 21/577 |

OTHER PUBLICATIONS

"Application as Filed in U.S. Appl. No. 17/745,689", filed May 16, 2022, 61 Pages.

"Application as Filed in U.S. Appl. No. 17/745,695", filed May 16, 2022, 69 Pages.

Levin, et al., "Automate threat response in Microsoft Sentinel with automation rules", Retrieved from: https://learn.microsoft.com/en-us/azure/sentinel/automate-incident-handling-with-automation-rules, Dec. 21, 2022, 13 Pages.

Plotnik, Idan, "Apiiro extends right! From code to runtime", Retrieved from: https://apiiro.com/blog/apiiro-extends-right-from-code-to-runtime/, Jun. 30, 2022, 5 Pages.

Zimmergren, et al., "Cloud monitoring and response", Retrieved from: https://learn.microsoft.com/en-us/azure/cloud-adoption-framework/manage/monitor/response, Jul. 7, 2023, 6 Pages.

* cited by examiner

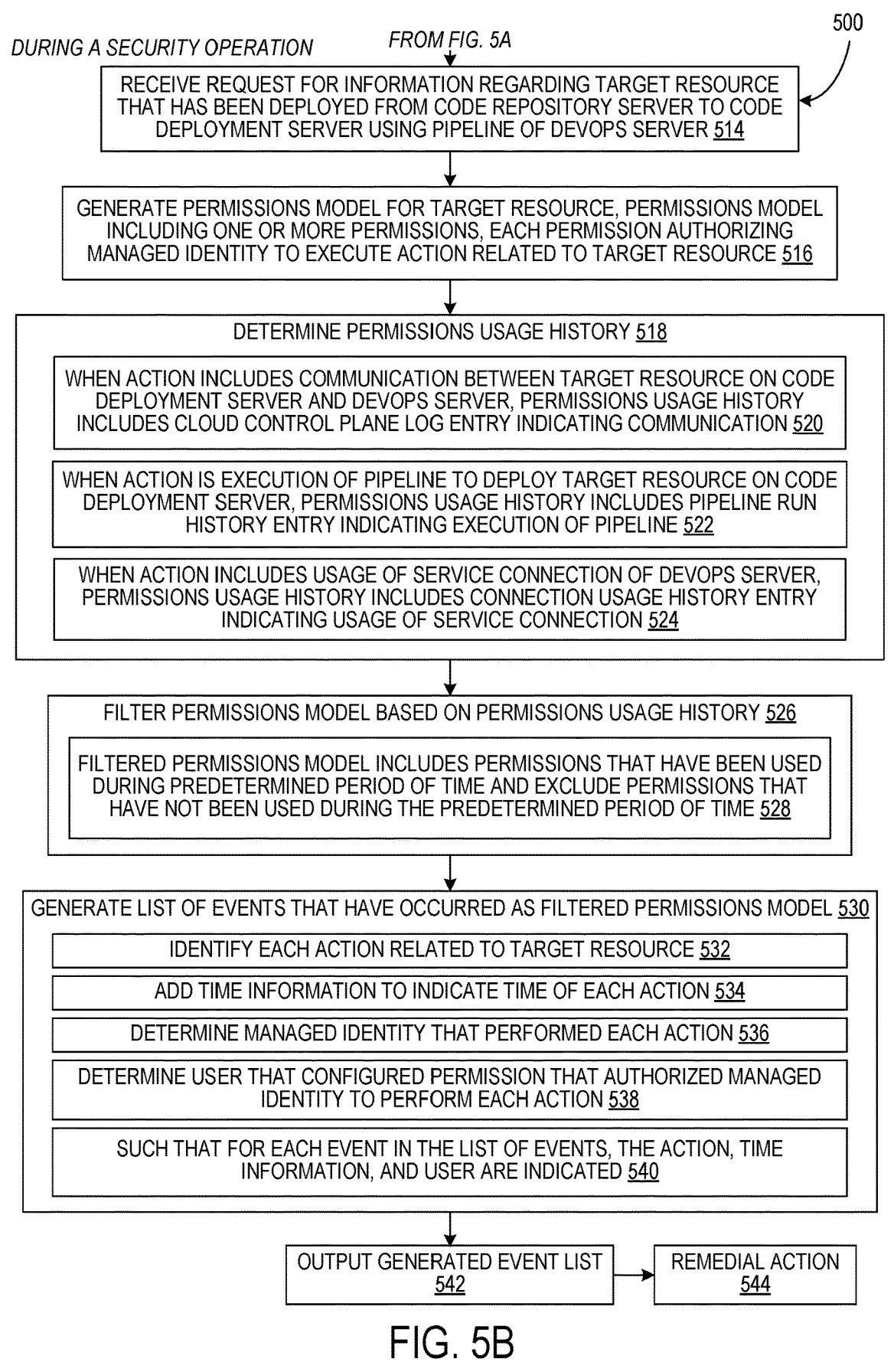

DURING A SECURITY OPERATION

FROM FIG. 5A

500

RECEIVE REQUEST FOR INFORMATION REGARDING TARGET RESOURCE THAT HAS BEEN DEPLOYED FROM CODE REPOSITORY SERVER TO CODE DEPLOYMENT SERVER USING PIPELINE OF DEVOPS SERVER 514

GENERATE PERMISSIONS MODEL FOR TARGET RESOURCE, PERMISSIONS MODEL INCLUDING ONE OR MORE PERMISSIONS, EACH PERMISSION AUTHORIZING MANAGED IDENTITY TO EXECUTE ACTION RELATED TO TARGET RESOURCE 516

DETERMINE PERMISSIONS USAGE HISTORY 518

WHEN ACTION INCLUDES COMMUNICATION BETWEEN TARGET RESOURCE ON CODE DEPLOYMENT SERVER AND DEVOPS SERVER, PERMISSIONS USAGE HISTORY INCLUDES CLOUD CONTROL PLANE LOG ENTRY INDICATING COMMUNICATION 520

WHEN ACTION IS EXECUTION OF PIPELINE TO DEPLOY TARGET RESOURCE ON CODE DEPLOYMENT SERVER, PERMISSIONS USAGE HISTORY INCLUDES PIPELINE RUN HISTORY ENTRY INDICATING EXECUTION OF PIPELINE 522

WHEN ACTION INCLUDES USAGE OF SERVICE CONNECTION OF DEVOPS SERVER, PERMISSIONS USAGE HISTORY INCLUDES CONNECTION USAGE HISTORY ENTRY INDICATING USAGE OF SERVICE CONNECTION 524

FILTER PERMISSIONS MODEL BASED ON PERMISSIONS USAGE HISTORY 526

FILTERED PERMISSIONS MODEL INCLUDES PERMISSIONS THAT HAVE BEEN USED DURING PREDETERMINED PERIOD OF TIME AND EXCLUDE PERMISSIONS THAT HAVE NOT BEEN USED DURING THE PREDETERMINED PERIOD OF TIME 528

GENERATE LIST OF EVENTS THAT HAVE OCCURRED AS FILTERED PERMISSIONS MODEL 530

IDENTIFY EACH ACTION RELATED TO TARGET RESOURCE 532

ADD TIME INFORMATION TO INDICATE TIME OF EACH ACTION 534

DETERMINE MANAGED IDENTITY THAT PERFORMED EACH ACTION 536

DETERMINE USER THAT CONFIGURED PERMISSION THAT AUTHORIZED MANAGED IDENTITY TO PERFORM EACH ACTION 538

SUCH THAT FOR EACH EVENT IN THE LIST OF EVENTS, THE ACTION, TIME INFORMATION, AND USER ARE INDICATED 540

OUTPUT GENERATED EVENT LIST 542

REMEDIAL ACTION 544

FIG. 5B

DEVELOPMENT AND OPERATIONS SERVER WITH CODE MAPPING MODULE

BACKGROUND

In the field of cloud computing, deployment of code to the cloud with source code management (SCM) tools such as a development and operations (DevOps) server can raise concerns about security vulnerabilities and weaknesses, and therefore the capability to map source code to runtime resources has become important for security and compliance, accountability, and change management. When a security incident occurs or is discovered, it can be very difficult to identify the source of the code (e.g., when, where, and who) that was deployed, in order to properly investigate the incident. Relying on traditional manual solutions such as naming conventions, tags, and comments often sets up an organization for failure, as it is technically difficult to constantly update and enforce compliance with these solutions on an entire organization. Accordingly, there is room for improvement in tracing code deployment with SCM tools.

SUMMARY

A distributed computing system is provided herein. The distributed computing system may include a code repository server configured to store code, a code deployment server configured to receive a deployment of the code, and a development and operations (DevOps) server configured to construct a pipeline between the code repository server and the code deployment server. The DevOps server may be configured to execute a source code management program to receive a request for information regarding a target resource that has been deployed from the code repository server to the code deployment server using the pipeline, generate a permissions model for the target resource, the permissions model including one or more permissions, each permission authorizing a managed identity to execute an action related to the target resource, determine a permissions usage history of the permissions contained in the permissions model, filter the permissions model based on the permissions usage history, and generate a list of events determined to have occurred as the filtered permissions model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5B show a flowchart of a computing method for use in a distributed computing system such as that of FIG. 1.

DETAILED DESCRIPTION

Figure 1:
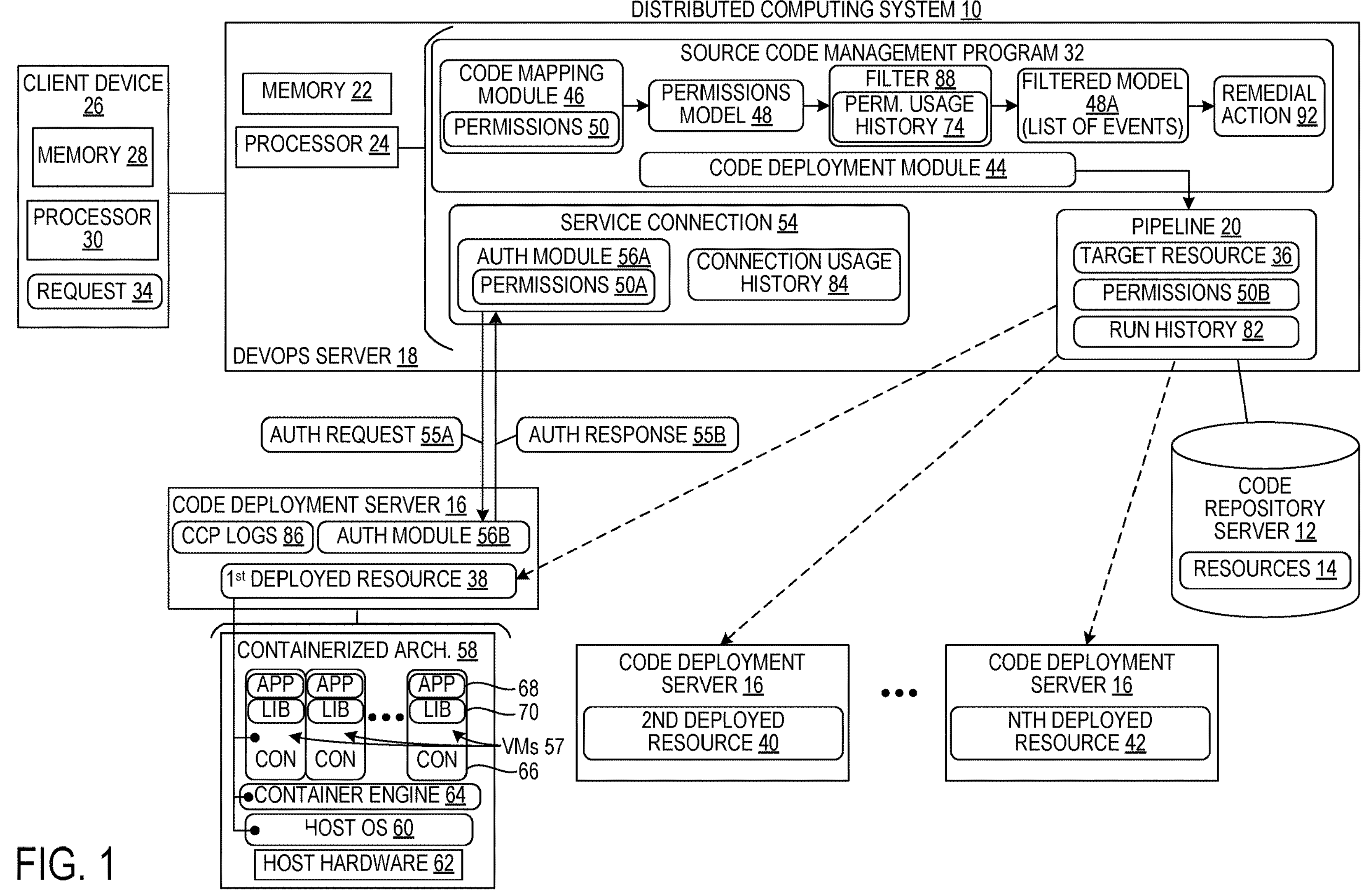
FIG. 1 shows a schematic view of an example distributed computing system including a code repository server, code deployment server, and development and operations (DevOps) server according to the present disclosure.

To address the issues discussed above, FIG. 1 shows a schematic view of an example distributed computing system 10 according to the present disclosure. The distributed computing system 10 may include a code repository server 12 configured to store code, illustrated as resources 14. The resources 14 may include, for example, code, files referenced by the code, directories, and file revision histories. The distributed computing system 10 may include a code deployment server 16 configured to receive a deployment of the code, illustrated with dashed arrows. The distributed computing system 10 may include one or more code repository servers 12, and may include one or more code deployment servers 16. The distributed computing system 10 may include a development and operations (DevOps) server 18 configured to construct a pipeline 20 between the code repository server 12 and the code deployment server 16, memory 22, and one or more processors 24. It will be appreciated that the DevOps server 18 will generally construct many pipelines 20 in order to fully develop and deploy a software product, but only one is discussed in detail for simplicity. One or more client devices 26 may be included in the distributed computing system 10 in order for users to access the various servers in the distributed computing system 10, and may include respective memory 28 and processors 30. Communication between the various machines of the distributed computing system 10 may be conducted over one or more networks.

The distributed computing system 10 may be configured to execute a source code management program 32 to perform various actions relating to management and forensics of the resources 14. For instance, the distributed computing system 10 may receive a request 34 (e.g., from ones of the client devices 26) for information regarding a target resource 36 that has been deployed from the code repository server 12 to the code deployment server 16 using the pipeline 20, as first deployed resource 38. The same or different resources 14 may be deployed to other code deployment servers 16 as second deployed resource 40 through nth deployed resource 42. The pipeline 20 may be instantiated by a code deployment module 44 of the source code management program 32. The request 34 may be, for example, part of routine security maintenance or in response to a specific incident such as evidence of a vulnerability in a resource or an abnormal behavior. In response to the request 34, the source code management program 32 may be configured to execute a code mapping module 46 to generate a permissions model 48 for the target resource 36. The permissions model 48 may include one or more permissions 50, each permission 50 authorizing a managed identity 52 (see FIG. 3) to execute an action related to the target resource 36. Each action may include, for example, an execution of the pipeline 20 to deploy the target resource 36 on the code deployment server 16, a usage of a service connection 54 of the DevOps server 18, or a communication between the target resource 36 on the code deployment server 16 and the DevOps server 18, as will be discussed in more detail with reference to FIG. 3. The managed identity 52 may be, for example, a user ID, machine ID, and/or service principal name (SPN). For instance, an SPN may have permissions 50A to the code deployment server 16 and may also be configured with credentials to the code repository server 12 (e.g., federated identity credentials). In another example, an SPN configuring the service connection 54 of the DevOps server 18 to the code deployment server 16 with an SPN secret may be granted permissions 50A to deploy to the code deployment server 16, and the pipeline 20 may be configured with permissions 50B defined in a project scope to use the service connection 54. The managed identity 52 may be authenticated by an authentication request 55A from an authentication module 56A of the service connection 54 being received at an authentication module 56B of the code deployment server 16, which may then send an authentication response 55B back.

Figure 2:
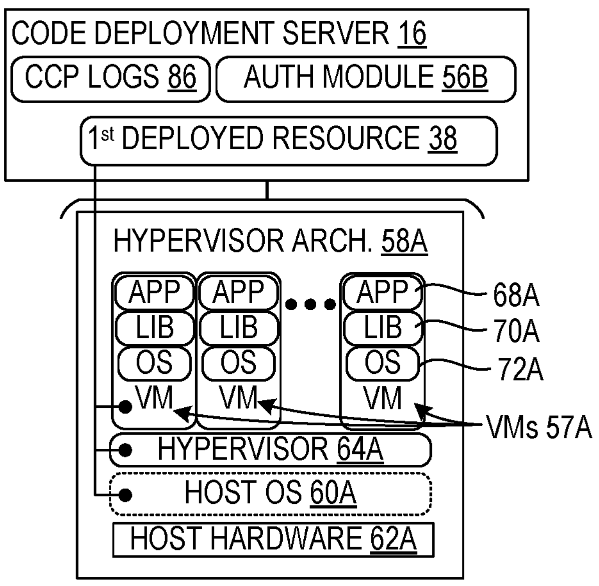
FIG. 2 shows a schematic view of alternative architecture of the code deployment server of FIG. 1.

The present disclosure is compatible with different types of architecture of the code deployment server 16. For example, as illustrated in FIG. 1, virtual machines 57 implemented by the code deployment server 16 may be implemented using a containerized architecture 58, or using a hypervisor architecture 58A as shown in FIG. 2. Continuing with FIG. 1, in the containerized architecture 58, a host operating system 60 is executed on host hardware 62 (e.g., processor, accelerator hardware, non-volatile storage memory, and volatile memory), along with an instance of a container engine 64. The container engine 64 provides a software interface between the host OS 60 and one or more containers 66. Each container 66 includes respective application programs 68 and libraries 70, binaries, and other data used by the application programs 68. In this way, each container 66 implements a containerized virtual machine 57 within the container 66. Alternatively, as shown in FIG. 2, code deployment server 16 may implement virtualization using the hypervisor architecture 58A, which includes a hypervisor 64A executed on a host OS 60A, which in turn is executed on host hardware 62A including a processor, memory, etc. The hypervisor 64A provides a software interface between the host OS 60A and external hypervisor control plane servers, as well as individual virtual machines 57A. Each virtual machine 57A includes a guest OS instance 72A, as well as libraries 70A, binaries, and other data used by application programs 68A executed within the hypervisor virtual machine 57A. In some implementations, host OS 60A may be omitted.

Figure 3:
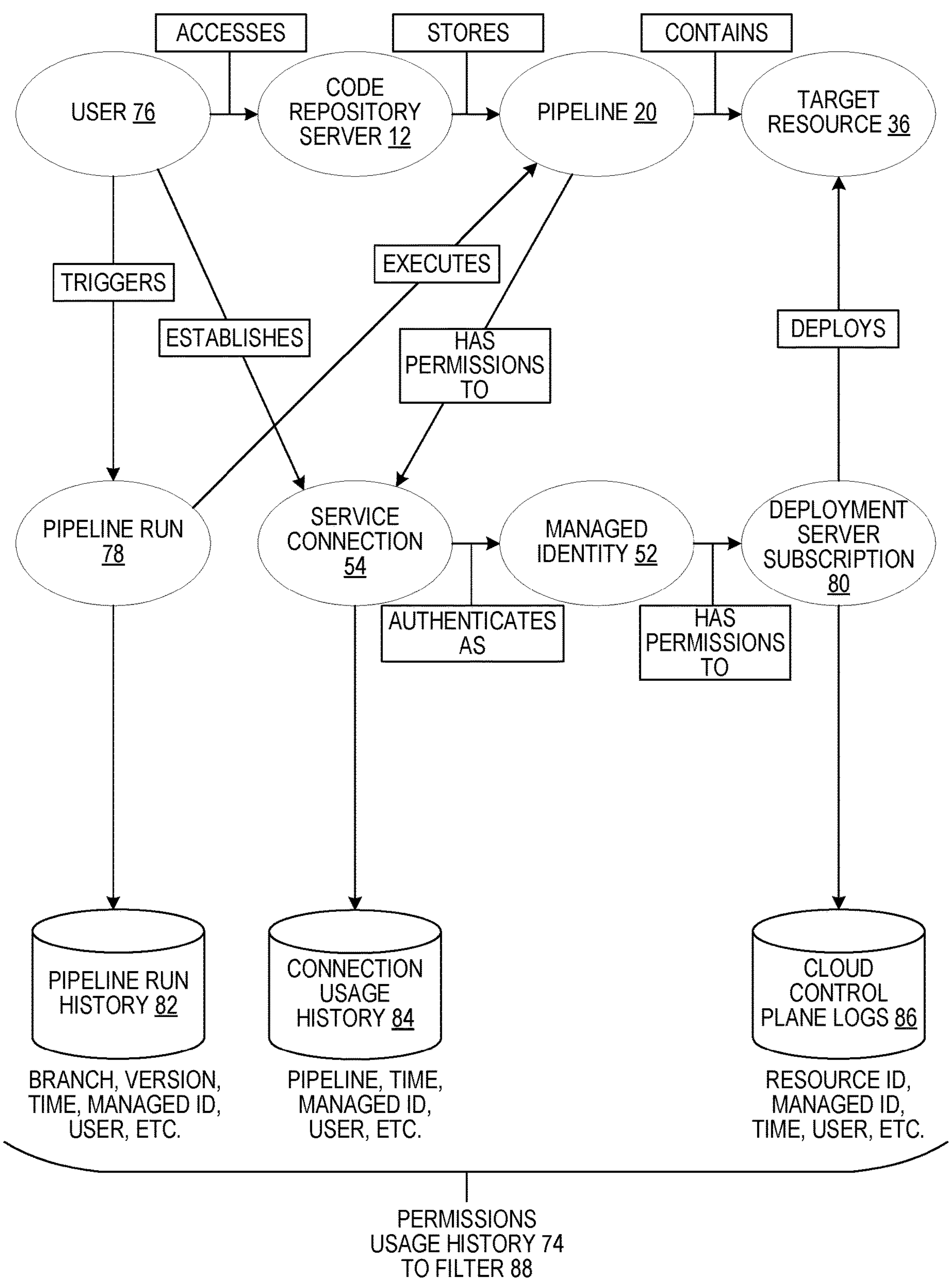
FIG. 3 shows a schematic view of communication within the distributed computing system of FIG. 1.

Many pipelines 20 may be built but not used, and therefore the permissions model 48 may indicate a list of potential deployments rather than actual deployments. Thus, for the purposes of whittling away irrelevant information and narrowing down the permissions model 48 to the permissions that may reveal the requested information about the target resource 36, the source code management program 32 may be configured to determine a permissions usage history 74 of the permissions 50 contained in the permissions model 48, as shown in FIG. 3. Here, an authorized user 76 can access the code repository server 12 (e.g., with federated credentials) storing the pipeline 20 containing the target resource 36. The same or a different authorized user 76 can trigger a pipeline run 78 to execute the pipeline containing the target resource 36. The pipeline 20 has permissions to one or more service connections 54 for connecting the DevOps server 18 to various external services in a secure manner. For example, the service connection 54 can authenticate as the managed identity 52, which has permissions to a deployment server subscription 80 for the code deployment server 16. As mentioned previously, the code deployment server 16 may then deploy the target resource 36. In this example, the permissions usage history 74 may include three different sources of data, but other suitable sources may be used. When the permitted actions include the execution of the pipeline 20 to deploy the target resource 36 on the code deployment server 16, the permissions usage history 74 may include a pipeline run history 82 entry indicating the execution of the pipeline. The pipeline run history 82 may include, for example, a branch, version, time, managed identity 52, and/or user for each entry. When the permitted actions include the usage of the service connection 54 of the DevOps server 18, the permissions usage history 74 may include a connection usage history 84 entry indicating the usage of the service connection 54. The connection usage history 84 may include, for example, a pipeline 20, time, managed identity 52, and/or user for each entry. When the permitted actions include a communication between the target resource 36 on the code deployment server 16 and the DevOps server 18, the permissions usage history 74 may include a cloud control plane log 86 entry indicating the communication. The cloud control plane logs 86 may be telemetry logs of a resource manager and may include, for example, a resource identity, managed identity 52, time, and/or user for each entry. By use of each of these types of permissions usage history 74, the requested information can be narrowed down and quickly identified.

Figure 4:
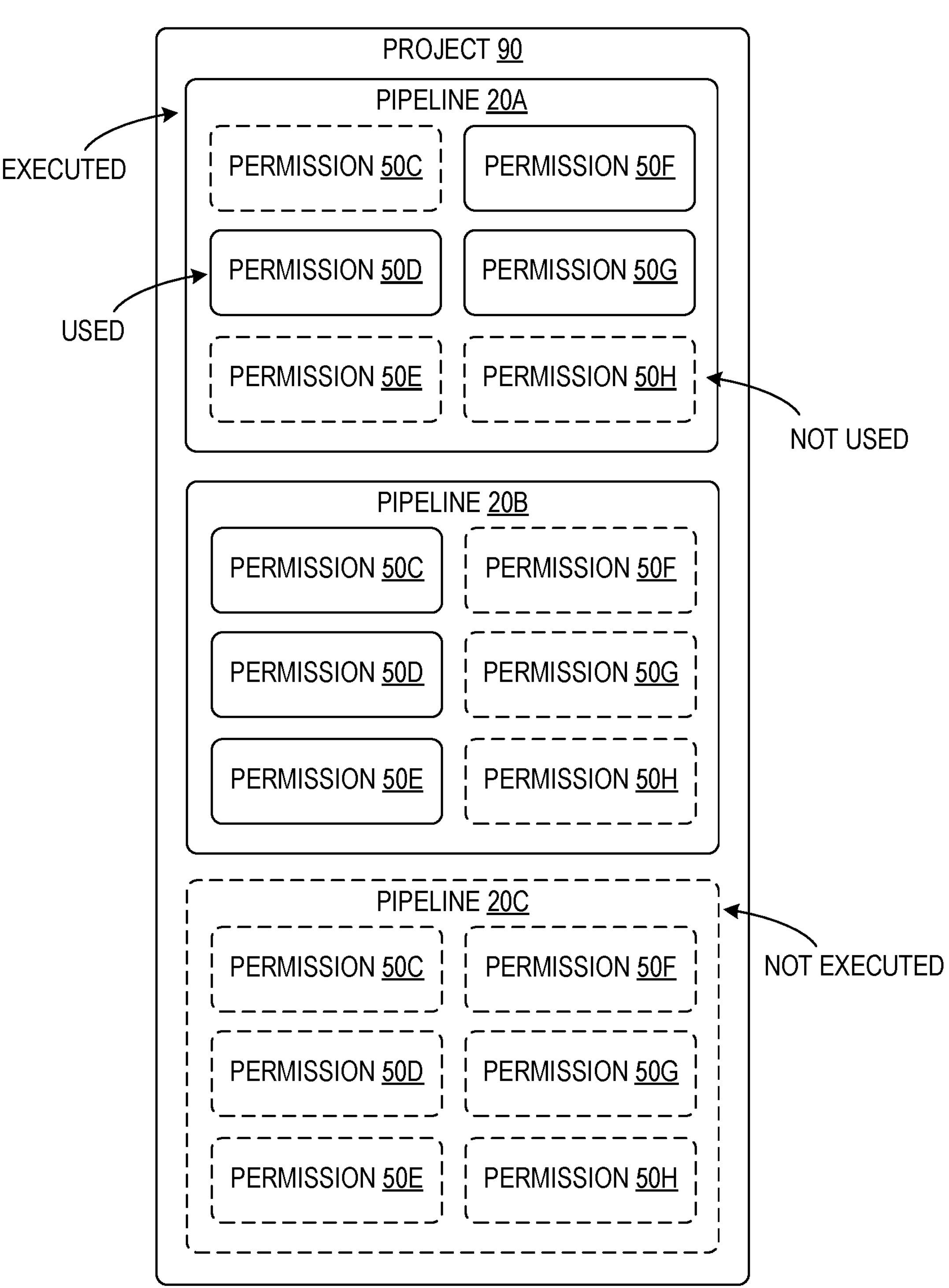
FIG. 4 shows an example project being filtered by the DevOps server of FIG. 1.

Returning to FIG. 1, the source code management program 32 may be configured to filter the permissions model 48 at filter 88 based on the permissions usage history 74. This is shown schematically in FIG. 4, where pipelines 20A, 20B, and 20C of a project 90 each contain permissions 50C-50H. Based on the permissions usage history 74, for example, entries in the permissions model 48 regarding pipeline 20C are filtered out because it was never executed, and unused permissions are similarly removed because they were never used by their respective pipeline 20A or 20B, as shown in dashed lines. Therefore, the source code management program 32 may be configured to generate a list of events determined to have occurred as the filtered permissions model 48A. In some implementations, the list of events may take the form of a column of data including relevant attributes regarding each event such as those discussed above regarding the permissions usage history of FIG. 3. This list of events may include the information targeted by the request 34. Since understanding the relationship between source code and runtime resources helps organizations quickly identify which part of the code is responsible for specified outputs and can be used to facilitate communication between developers and security, this can help security not only solve a current incident but also anticipate vulnerabilities that will be pushed into a specific security context that can create a potential security incident in the future.

The list of events may be limited in scope based on parameters of the request 34, such as by a specific timeframe, managed identity, or pipeline. Thus, the filtered permissions model 48A may include permissions that have been used during a predetermined period of time (e.g., permissions in solid lines in FIG. 4) and exclude permissions that have not been used during the predetermined period of time (e.g., permissions in dashed lines in FIG. 4). In this manner, the output may quickly pinpoint the information targeted by the request 34. In more detail, the source code management program 32 may be configured to generate the list of events at least in part by identifying each action related to the target resource 36, adding time information to indicate a time of each action, determining a managed identity that performed each action, and determining a user that configured the permission that authorized the managed identity to perform each action, such that for each event in the list of events, the action, time information, and user are indicated. This complete and relevant information may aid in the prompt investigation of a security incident regarding the first deployed resource 38. For example, the list of events may help distinguish between the first deployed resource 38, second deployed resource 40, and nth deployed resource 42; various different pipelines 20; various different code repository servers 12; various managed identities 52 or users responsible for the action, etc., and identify information of interest.

In some implementations, after generating the filtered model 48A, the source code management program 32 may be further configured to generate a remedial action 92 based upon the generated list of events, and output the remedial action 92. Outputting the remedial action 92 may include either direct action or instructions to a user (e.g., of the client device 26) to perform the remedial action 92. The remedial action 92 may be programmatically determined based on attributes of the request 34, the request 34 may include instructions to perform the remedial action upon finishing the filtering of the permissions model 48, or the user may be presented with preset options from which the user may choose. For example, the remedial action 92 may be to delete the target resource 36 from the code deployment server 16. Or, if the action is deployment of the target resource 36 that resulted in a misconfiguration of code on the code deployment server 16, then the remedial action may be to revert to a version of the code on the code deployment server 16 prior to the deployment. Accordingly, not only is the requested information located for the user making the request 34, but a remedial action 92 addressing the incident sparking the request is easily performable.

Figure 5A:
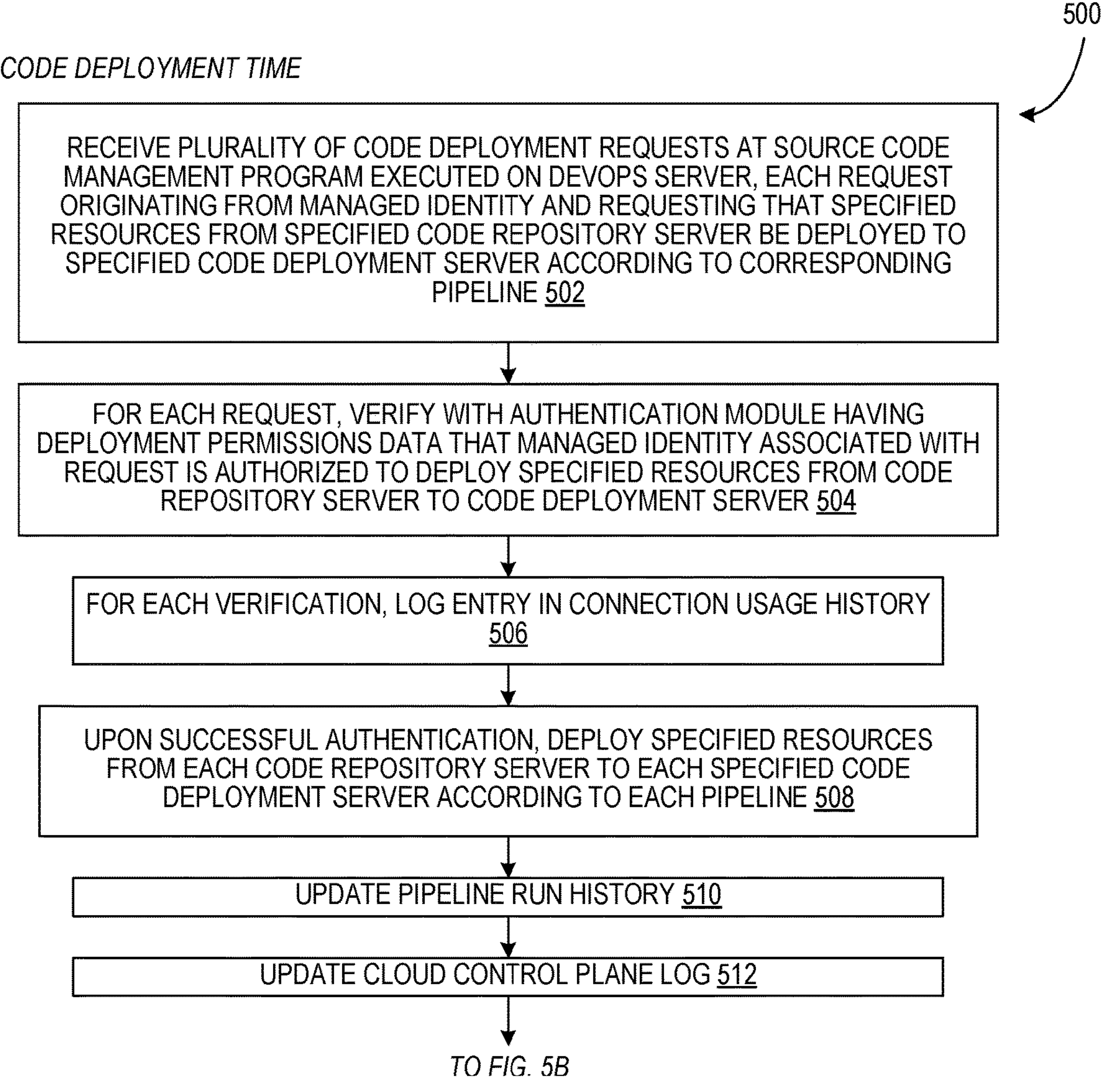

FIGS. 5A-B show a flowchart of a computing method 500 which may be implemented by distributed computing system 10 including the DevOps server 18, code repository server 12, and code deployment server 16 illustrated in FIG. 1. FIG. 5A may show a portion of method 500 executed at code deployment time. At 502, the method 500 may include receiving a plurality of code deployment requests at a source code management program executed on a DevOps server, each request originating from a managed identity and requesting that specified resources from a specified code repository server be deployed to a specified code deployment server according to a corresponding pipeline. At 504, the method 500 may include, for each request, verifying with an authentication module having deployment permissions data that the managed identity associated with the request is authorized to deploy the specified resources from the code repository server to the code deployment server. At 506, the method 500 may include, for each verification, logging an entry in a connection usage history. As discussed above, the connection usage history may include, for example, a pipeline, time, managed identity, and/or user for each entry. At 508, the method 500 may include, upon successful authentication, deploying the specified resources from each code repository server to each specified deployment server according to each pipeline. Finally, at 510, the method 500 may include updating a pipeline run history, and at 512, updating a cloud control plane log (see details at FIG. 3). In this manner, various data forming permissions usage history may be gathered.

Turning to FIG. 5B, the second half of method 500 is illustrated. This half may be executed during a security operation, and may be performed at a source code management program executed on the DevOps server. At 514, the method 500 may include receiving a request for information regarding a target resource that has been deployed from the code repository server to the code deployment server using a pipeline of the DevOps server. At 516, the method 500 may include generating a permissions model for the target resource, the permissions model including one or more permissions, each permission authorizing a managed identity to execute an action related to the target resource. At 518, the method 500 may include determining a permissions usage history of the permissions contained in the permissions model. At 520, when the action includes a communication between the target resource on the code deployment server and the DevOps server, the permissions usage history may include a cloud control plane log entry indicating the communication. At 522, when the action is an execution of the pipeline to deploy the target resource on the code deployment server, the permissions usage history may include a pipeline run history entry indicating the execution of the pipeline. At 524, when the action includes a usage of a service connection of the DevOps server, the permissions usage history may include a connection usage history entry indicating the usage of the service connection. Thus, the data logged in the first half of method 500 may be used to compile the permissions usage history to make use of the permissions usage history more thorough.

At 526, the method 500 may include filtering the permissions model based on the permissions usage history. At 528, the filtered permissions model may include permissions that have been used during a predetermined period of time and exclude permissions that have not been used during the predetermined period of time. In this manner, permissions that are irrelevant to the request for information may be easily removed from the permissions model.

At 530, the method 500 may include generating a list of events determined to have occurred as the filtered permissions model. According to one more detailed implementation, generating the list of events is accomplished at least in part by, at 532, identifying each action related to the target resource; at 534, adding time information to indicate a time of each action; at 536, determining a managed identity that performed each action; and at 538, determining a user that configured the permission that authorized the managed identity to perform each action; such that, at 540, for each event in the list of events, the action, time information, and user are indicated. In this manner, relevant details regarding an incident sparking the request for information may be collected.

At 542, the method 500 may include outputting the generated list of events. The list may be output to the user that made the original request for information, for example. The user may be able to use the information to address a concern that led to making the request. Alternatively or additionally, at 544, the method 500 may include generating a remedial action based upon the generated list of events and outputting the remedial action. For example, the remedial action may be to delete the target resource from the code deployment server. In another example, the action may be deployment of the target resource that resulted in a misconfiguration of code on the code deployment server, and the remedial action may be to revert to a version of the code on the code deployment server prior to the deployment. In this manner, rather than simply report the generated list back to the requesting user, the DevOps server may be able to either propose a helpful remedial action to address the incident or set the remedial action in motion itself.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
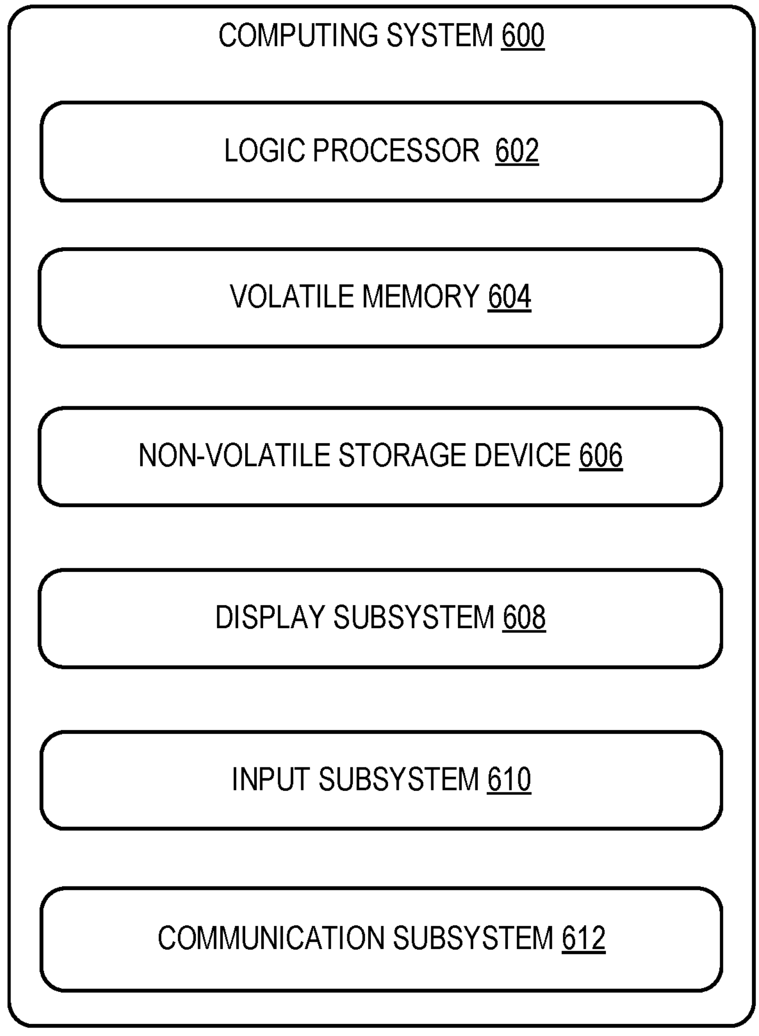
FIG. 6 shows a schematic view of an example computing environment in which the distributed computing system of FIG. 1 may be enacted.

FIG. 6 schematically shows a non-limiting embodiment of a computing system 600 that can enact one or more of the methods and processes described above. Computing system 600 is shown in simplified form. Computing system 600 may embody the distributed computing system 10 described above and illustrated in FIG. 1. Components of computing system 600 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor may optionally be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms “module,” “program,” and “engine” may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms “module,” “program,” and “engine” may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, camera, or microphone.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 600 to send and/or receive messages to and/or from other devices via a network such as the Internet.

The following paragraphs provide additional support for the claims of the subject application. One aspect provides a distributed computing system, comprising a code repository server configured to store code, a code deployment server configured to receive a deployment of the code, and a development and operations (DevOps) server configured to construct a pipeline between the code repository server and the code deployment server. The DevOps server is configured to execute a source code management program to receive a request for information regarding a target resource that has been deployed from the code repository server to the code deployment server using the pipeline, generate a permissions model for the target resource, the permissions model including one or more permissions, each permission authorizing a managed identity to execute an action related to the target resource, determine a permissions usage history of the permissions contained in the permissions model, filter the permissions model based on the permissions usage history, and generate a list of events determined to have occurred as the filtered permissions model. In this aspect, additionally or alternatively, the action is an execution of the pipeline to deploy the target resource on the code deployment server, and the permissions usage history includes a pipeline run history entry indicating the execution of the pipeline. In this aspect, additionally or alternatively, the action includes a usage of a service connection of the DevOps server, and the permissions usage history includes a connection usage history entry indicating the usage of the service connection. In this aspect, additionally or alternatively, the action includes a communication between the target resource on the code deployment server and the DevOps server, and the permissions usage history includes a cloud control plane log entry indicating the communication. In this aspect, additionally or alternatively, the filtered permissions model includes permissions that have been used during a predetermined period of time and excludes permissions that have not been used during the predetermined period of time. In this aspect, additionally or alternatively, the source code management program is configured to generate the list of events at least in part by identifying each action related to the target resource, adding time information to indicate a time of each action, determining a managed identity that performed each action, and determining a user that configured the permission that authorized the managed identity to perform each action, such that for each event in the list of events, the action, time information, and user are indicated. In this aspect, additionally or alternatively, the source code management program is further configured to generate a remedial action based upon the generated list of events, and output the remedial action. In this aspect, additionally or alternatively, the remedial action is to delete the target resource from the code deployment server. In this aspect, additionally or alternatively, the action is deployment of the target resource that resulted in a misconfiguration of code on the code deployment server, and the remedial action is to revert to a version of the code on the code deployment server prior to the deployment.

Another aspect provides a computing method for use in a distributed computing system including a development and operations (DevOps) server, a code repository server, and a code deployment server. The method comprises, at a source code management program executed on the DevOps server, receiving a request for information regarding a target resource that has been deployed from the code repository server to the code deployment server using a pipeline of the DevOps server, generating a permissions model for the target resource, the permissions model including one or more permissions, each permission authorizing a managed identity to execute an action related to the target resource, determining a permissions usage history of the permissions contained in the permissions model, filtering the permissions model based on the permissions usage history, and generating a list of events determined to have occurred as the filtered permissions model. In this aspect, additionally or alternatively, the action is an execution of the pipeline to deploy the target resource on the code deployment server, and the permissions usage history includes a pipeline run history entry indicating the execution of the pipeline. In this aspect, additionally or alternatively, the action includes a usage of a service connection of the DevOps server, and the permissions usage history includes a connection usage history entry indicating the usage of the service connection. In this aspect, additionally or alternatively, the action includes a communication between the target resource on the code deployment server and the DevOps server, and the permissions usage history includes a cloud control plane log entry indicating the communication. In this aspect, additionally or alternatively, the filtered permissions model includes permissions that have been used during a predetermined period of time and excludes permissions that have not been used during the predetermined period of time. In this aspect, additionally or alternatively, generating the list of events is accomplished at least in part by identifying each action related to the target resource, adding time information to indicate a time of each action, determining a managed identity that performed each action, and determining a user that configured the permission that authorized the managed identity to perform each action, such that for each event in the list of events, the action, time information, and user are indicated. In this aspect, additionally or alternatively, the method further comprises generating a remedial action based upon the generated list of events, and outputting the remedial action. In this aspect, additionally or alternatively, the remedial action is to delete the target resource from the code deployment server. In this aspect, additionally or alternatively, the action is deployment of the target resource that resulted in a misconfiguration of code on the code deployment server, and the remedial action is to revert to a version of the code on the code deployment server prior to the deployment.

Another aspect provides a development and operations (DevOps) server configured to construct a pipeline between a code repository server configured to store code and a code deployment server configured to receive a deployment of the code. The DevOps server is configured to execute a source code management program to receive a request for information regarding a target resource that has been deployed from the code repository server to the code deployment server using the pipeline, generate a permissions model for the target resource, the permissions model including one or more permissions, each permission authorizing a managed identity to execute an action related to the target resource, determine a permissions usage history of the permissions contained in the permissions model, filter the permissions model based on the permissions usage history, and generate a list of events determined to have occurred as the filtered permissions model. In this aspect, additionally or alternatively, the action is an execution of the pipeline to deploy the target resource on the code deployment server, and the permissions usage history includes a pipeline run history entry indicating the execution of the pipeline.

"And/or" as used herein is defined as the inclusive or V, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A distributed computing system, comprising:

a code repository server configured to store code;

a code deployment server configured to receive a deployment of the code; and a development and operations (DevOps) server configured to construct a pipeline between the code repository server and the code deployment server, and to execute a source code management program to:

receive a request for information regarding a target resource that has been deployed from the code repository server to the code deployment server using the pipeline;

generate a permissions model for the target resource, the permissions model including one or more permissions, each permission authorizing a managed identity to execute an action related to the target resource;

determine a permissions usage history of the permissions contained in the permissions model;

filter the permissions model based on the permissions usage history to create a filtered permission model, wherein the filtered permissions model includes permissions that have been used and excludes permissions that have not been used;

generate a list of events determined to have occurred as the filtered permissions model; and perform a remedial action based upon the generated list of events, wherein the action is a first action that includes an execution of the pipeline to deploy the target resource on the code deployment server;

the permissions usage history includes a pipeline run history entry indicating the execution of the pipeline; and the remedial action is to delete the target resource from the code deployment server, or to revert to a version of code on the code deployment server prior to the deployment.

2. The distributed computing system of claim 1, wherein the permissions model further includes one or more permissions each authorizing a managed identity to execute a second action related to the target resource;

the second action includes a usage of a service connection of the DevOps server; and the permissions usage history includes a connection usage history entry indicating the usage of the service connection.

3. The distributed computing system of claim 1, wherein the permissions model further includes one or more permissions each authorizing a managed identity to execute a second action related to the target resource;

the second action includes a communication between the target resource on the code deployment server and the DevOps server; and the permissions usage history includes a cloud control plane log entry indicating the communication.

4. The distributed computing system of claim 1, wherein the filtered permissions model includes permissions that have been used during a predetermined period of time and excludes permissions that have not been used during the predetermined period of time.

5. The distributed computing system of claim 1, wherein the source code management program is configured to generate the list of events at least in part by:

identifying each action related to the target resource;

adding time information to indicate a time of each action;

determining a managed identity that performed each action; and determining a user that configured the permission that authorized the managed identity to perform each action, such that for each event in the list of events, the action, time information, and user are indicated.

6. The distributed computing system of claim 1, wherein the remedial action is to delete the target resource from the code deployment server.

7. The distributed computing system of claim 1, wherein the deployment of the target resource on the code deployment server resulted in a misconfiguration of the code on the code deployment server; and the remedial action is to revert to the version of the code on the code deployment server prior to the deployment.

8. The distributed computing system of claim 1, wherein the request includes instructions to perform the remedial action upon finishing the filtering of the permissions model.

9. The distributed computing system of claim 1, wherein the DevOps server is configured to execute the source code management program to programmatically determine the remedial action based on attributes of the request.

10. A computing method for use in a distributed computing system including a development and operations (DevOps) server, a code repository server, and a code deployment server, the method comprising, at a source code management program executed on the DevOps server:

receiving a request for information regarding a target resource that has been deployed from the code repository server to the code deployment server using a pipeline of the DevOps server;

generating a permissions model for the target resource, the permissions model including one or more permissions, each permission authorizing a managed identity to execute an action related to the target resource;

determining a permissions usage history of the permissions contained in the permissions model;

filtering the permissions model based on the permissions usage history to create a filtered permission model, wherein the filtered permissions model includes permissions that have been used and excludes permissions that have not been used;

generating a list of events determined to have occurred as the filtered permissions model; and performing a remedial action based upon the generated list of events, wherein the action is a first action that includes an execution of the pipeline to deploy the target resource on the code deployment server;

the permissions usage history includes a pipeline run history entry indicating the execution of the pipeline; and the remedial action is to delete the target resource from the code deployment server, or to revert to a version of code on the code deployment server prior to the deployment.

11. The computing method of claim 10, wherein the permissions model further includes one or more permissions each authorizing a managed identity to execute a second action related to the target resource;

the second action includes a usage of a service connection of the DevOps server; and the permissions usage history includes a connection usage history entry indicating the usage of the service connection.

12. The computing method of claim 10, wherein the permissions model further includes one or more permissions each authorizing a managed identity to execute a second action related to the target resource;

the second action includes a communication between the target resource on the code deployment server and the DevOps server; and the permissions usage history includes a cloud control plane log entry indicating the communication.

13. The computing method of claim 10, wherein the filtered permissions model includes permissions that have been used during a predetermined period of time and excludes permissions that have not been used during the predetermined period of time.

14. The computing method of claim 10, wherein generating the list of events is accomplished at least in part by:

identifying each action related to the target resource;

adding time information to indicate a time of each action;

determining a managed identity that performed each action; and determining a user that configured the permission that authorized the managed identity to perform each action, such that for each event in the list of events, the action, time information, and user are indicated.

15. The computing method of claim 10, wherein the remedial action is to delete the target resource from the code deployment server.

16. The computing method of claim 10, wherein the deployment of the target resource on the code deployment server resulted in a misconfiguration of the code on the code deployment server; and the remedial action is to revert to the version of the code on the code deployment server prior to the deployment.

17. The computing method of claim 10, wherein the request includes instructions to perform the remedial action upon finishing the filtering of the permissions model.

18. The computing method of claim 10, further comprising programmatically determining the remedial action based on attributes of the request.

19. A development and operations (DevOps) server configured to construct a pipeline between a code repository server configured to store code and a code deployment server configured to receive a deployment of the code, and to execute a source code management program to:

receive a request for information regarding a target resource that has been deployed from the code repository server to the code deployment server using the pipeline;

generate a permissions model for the target resource, the permissions model including one or more permissions, each permission authorizing a managed identity to execute an action related to the target resource;

determine a permissions usage history of the permissions contained in the permissions model;

filter the permissions model based on the permissions usage history to create a filtered permissions model, wherein the filtered permissions model includes permissions that have been used and excludes permissions that have not been used;

generate a list of events determined to have occurred as the filtered permissions model; and perform a remedial action based upon the generated list of events, wherein the action is a first action that includes an execution of the pipeline to deploy the target resource on the code deployment server;

the permissions usage history includes a pipeline run history entry indicating the execution of the pipeline; and the remedial action is to delete the target resource from the code deployment server, or to revert to a version of code on the code deployment server prior to the deployment.

20. The DevOps server of claim 19, further configured to execute the source code management program to programmatically determine the remedial action based on attributes of the request.

* * * * *